US010761346B1

(12) United States Patent
Yang et al.

(10) Patent No.: US 10,761,346 B1
(45) Date of Patent: Sep. 1, 2020

(54) HEAD-MOUNTED COMPUTER DEVICE WITH HINGE

(71) Applicant: AMAZON TECHNOLOGIES, INC., Seattle, WA (US)

(72) Inventors: Jung Sik Yang, Santa Clara, CA (US); Eliot Kim, Los Gatos, CA (US); Chia-Jean Wang, Palo Alto, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/981,641

(22) Filed: Dec. 28, 2015

(51) Int. Cl.
G02C 5/22 (2006.01)
G02C 11/00 (2006.01)
G02C 5/14 (2006.01)
G02C 5/02 (2006.01)

(52) U.S. Cl.
CPC ............ G02C 5/22 (2013.01); G02C 5/02 (2013.01); G02C 5/146 (2013.01); G02C 5/2281 (2013.01); G02C 11/10 (2013.01)

(58) Field of Classification Search
CPC ........ G02C 5/14; G02C 5/146; G02C 5/2209; G02C 11/04; G02C 11/10; G02C 5/22–5/229
USPC .................................. 351/153, 158; 16/228
See application file for complete search history.

(56) References Cited

U.S. PATENT DOCUMENTS

| 4,243,305 A * | 1/1981 | Elder ...................... G02C 5/22 16/228 |
| 5,975,693 A * | 11/1999 | Malfroy ................. G02C 5/008 16/228 |
| 6,099,117 A * | 8/2000 | Gregory .................... G02C 5/22 351/153 |
| 6,163,926 A * | 12/2000 | Watanabe ................ G02C 5/22 16/228 |
| 6,764,175 B1 * | 7/2004 | Chen ......................... G02C 9/00 351/47 |
| 7,369,414 B2 | 5/2008 | Kim |
| 7,493,674 B2 * | 2/2009 | Qin ........................ G03B 17/04 16/328 |

(Continued)

OTHER PUBLICATIONS

Mai, Huy Kim, "Non-Final Office Action dated March 29, 2017", U.S. Appl. No. 14/981,563, The United States Patent and Trademark Office, dated Mar. 29, 2017.
Deherrera, Kristina M., "Final Office Action dated Nov. 26, 2018", U.S. Appl. No. 14/981,563. The United States Patent and Trademark Office, dated Nov. 26, 2018.

(Continued)

Primary Examiner — Darryl J Collins
(74) Attorney, Agent, or Firm — Lindauer Law, PLLC

(57) ABSTRACT

A head-mounted wearable device utilizes electronics placed in one or more of a left temple or a right temple. The temples are joined to a front frame using hinges. The hinges provide passageways, slots, or other openings to permit passage of a flexible printed circuit (FPC) within an open core of the hinge. The FPC allows communication between the left temple and the right temple. During motion of the hinge, the FPC may twist such that the ends within the hinge are rotated relative to one another while remaining substantially parallel to one another. The overall length of the FPC passing through the hinge remains substantially unchanged between the hinge being open or closed. The FPC remains protected within the hinge and is minimally displaced, preventing the introduction of a crease in the FPC at a hinge line.

21 Claims, 12 Drawing Sheets

(56) References Cited

U.S. PATENT DOCUMENTS

| | | | |
|---|---|---|---|
| 7,527,374 B2 * | 5/2009 | Chou | G02C 11/06 351/154 |
| 8,553,910 B1 | 10/2013 | Dong et al. | |
| 9,366,882 B2 | 6/2016 | Iurilli | |
| 2002/0112320 A1 * | 8/2002 | Hayashi | B60R 16/0207 16/386 |
| 2006/0143864 A1 * | 7/2006 | Ge | H04M 1/0216 16/374 |
| 2008/0192199 A1 | 8/2008 | Hotellier | |
| 2010/0110368 A1 | 5/2010 | Chaum | |
| 2010/0205777 A1 | 8/2010 | Kim | |
| 2010/0206976 A1 * | 8/2010 | Salentine | A45F 5/004 242/379.2 |
| 2012/0011683 A9 | 1/2012 | Kim | |
| 2014/0204517 A1 * | 7/2014 | Hosoya | H05K 3/361 361/679.08 |
| 2015/0131048 A1 | 5/2015 | Iurilli | |

OTHER PUBLICATIONS

Deherrera, Kristina M., Notice of Allowance dated Oct. 10, 2017, U.S. Appl. No. 14/981,563, The United States Patent and Trademark Office, dated Oct. 10, 2017.

Deherrera, Kristina M., Non-final Office Action dated Jun. 12, 2018, U.S. Appl. No. 14/981,563, The United States Patent and Trademark Office, dated Jun. 12, 2018.

Deherrera, Kristina M., "Non-final Office Action dated Aug. 15, 2019", U.S. Appl. No. 14/981,563, The United States Patent and Trademark Office, dated Aug. 15, 2019.

Deherrera, Kristina M., "Advisory Action dated Feb. 20, 2019", U.S. Appl. No. 14/981,563, The United States Patent and Trademark Office, dated Feb. 20, 2019.

Deherrera, Kristina M., "Notice of Allowance dated Jan. 17, 2020", U.S. Appl. No. 14/981,563, The United States Patent and Trademark Office, dated Jan. 17, 2020.

* cited by examiner

HEAD-MOUNTED COMPUTER DEVICE WITH HINGE

BACKGROUND

Wearable devices provide many benefits to users, allowing easier and more convenient access to information and services.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
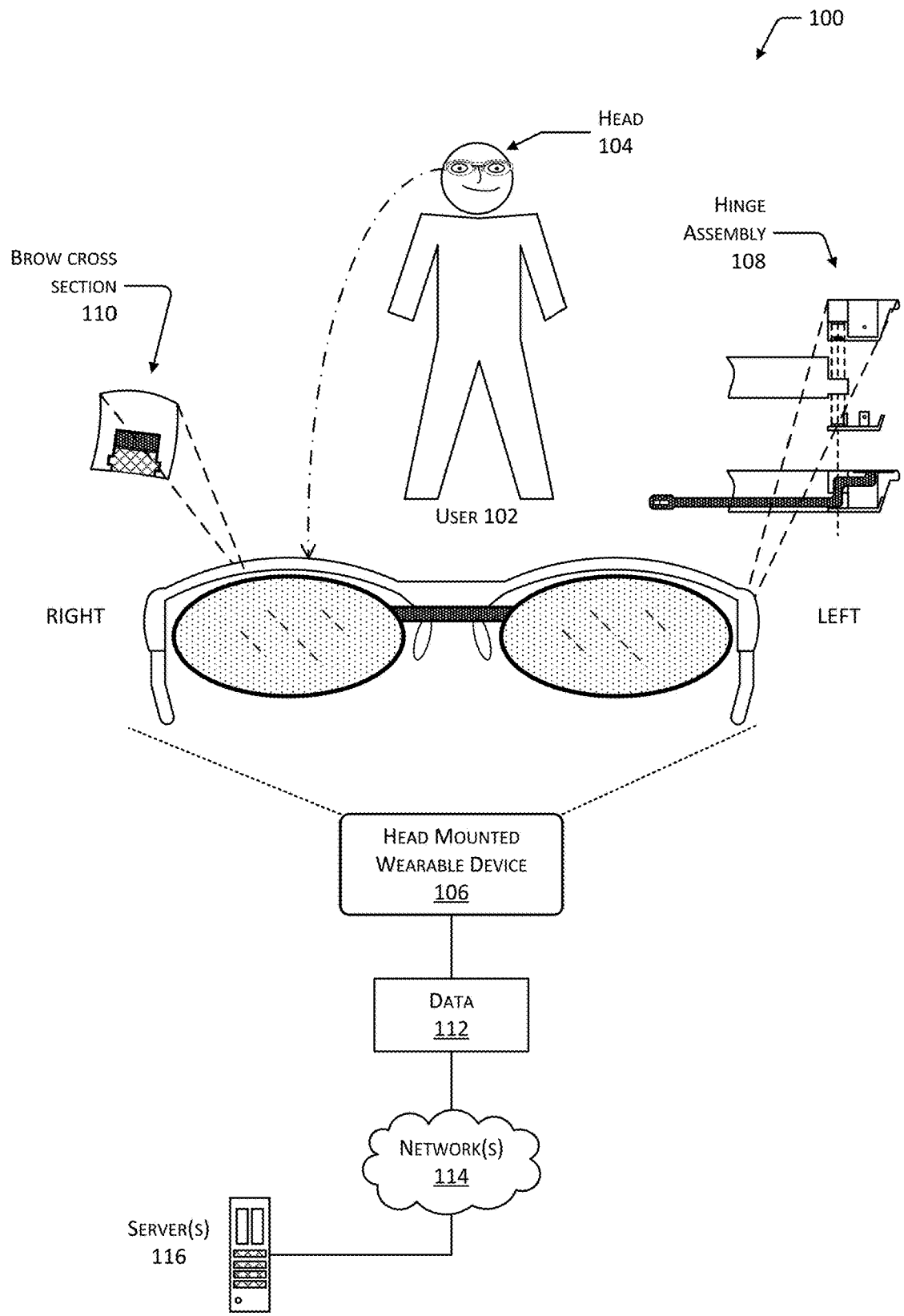
FIG. 1 depicts a system including a head-mounted wearable device and one or more servers, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Wearable devices provide many benefits to users, allowing easier and more convenient access to information and services. For example, a head-mounted wearable device having a form factor similar to eyeglasses may provide a ubiquitous and easily worn device to access information.

Traditional head-mounted wearable devices (HMWDs) have been limited in their physical configuration by various factors. For example, traditionally electronics for a device may be installed on a single side of the eyeglasses due to the difficulties involved in providing a wired connection between the sides. A low-profile, small volume technique for establishing a physical connection between electronics in a left temple and a right temple is described in this disclosure. A front frame includes a channel through which a flexible printed circuit (FPC) is arranged. For example, the channel may comprise a contiguous groove or inset that opens downwards from a bottom edge of the front frame. A retention piece may be used to maintain the FPC in place, protect the FPC from environmental contaminants, and so forth. For example, the retention piece may comprise a silicone plastic overmold piece that is mechanically engaged to the channel.

The HMWD may use hinges to allow for folding of the temples. In this folded configuration, the HMWD may be more easily stored. In the unfolded configuration, the HMWD is ready to be placed on a user's head. Traditional systems may require an abrupt bend which reduces service life due to early breakage, or require excess material proximate to the hinge. These traditional systems may result in a poor user experience due to early breakage, additional bulk, and so forth.

A hinge having an open core is described, that permits passage of the FPC from one side of the hinge to the other. During rotation of the hinge, the otherwise flat FPC may exhibit a slight twisting motion, with the respective ends of the FPC within the open core of the hinge being substantially parallel to one another, but having a non-zero angular difference between them. The FPC may exhibit two bends of about 90 degrees within a plane of the FPC, to form an approximately "S" shaped profile. Before and after torsion of the FPC, the overall distance between the two bends remains substantially the same. As a result, no excess material needs to be provided, allowing for a smaller hinge. Additionally, the slight twist in the FPC produces less strain on the conductors or waveguides therein, improving reliability of the connection.

Illustrative System

FIG. 1 depicts a system 100 in which a user 102 is wearing on their head 104 a HMWD 106 in a general form factor of eyeglasses. The HMWD 106 may incorporate hinges to allow the temples of the eyeglasses to fold. An expanded view of the hinge assembly 108 is depicted. Also depicted is an enlargement of a brow cross section 110. This enlargement depicts that the HMWD 106 may also incorporate a channel within which a flexible printed circuit (FPC) may allow for communication between a left temple and a right temple of the eyeglasses. These and other aspects of the HMWD 106 are discussed in more detail below.

The HMWD 106 may exchange data 112 using one or more networks 114 with one or more servers 116. The servers 116 may support one or more services. These services may be automated, manual, or a combination of automated and manual processes.

While the following is discussed in terms of a HMWD 106, it is understood that the mechanisms and techniques may be applied to other devices in other form factors. For example, bracelets, anklets, belts, and so forth.

Figure 2:
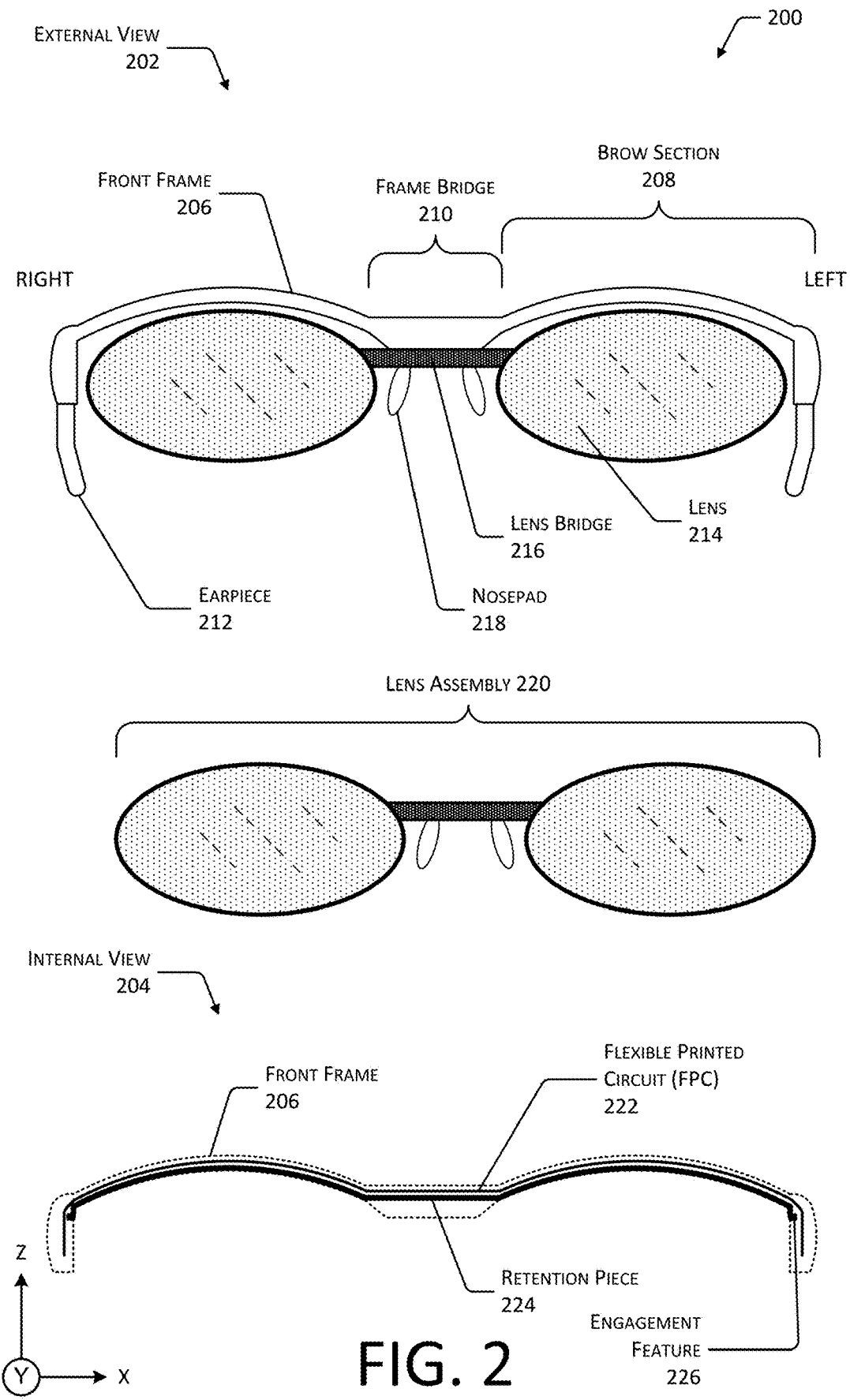
FIG. 2 depicts a front view of the head-mounted wearable device, according to some implementations.

FIG. 2 depicts a front view 200 of the HMWD 106, according to some implementations. An external view 202 shows the exterior appearance of the HMWD 106 while an internal view 204 shows selected components within the HMWD 6.

In the external view 202, a front frame 206 is depicted. The front frame 206 may include a left brow section 208(L) and a right brow section 208(R) that are joined by a frame bridge 210. In some implementations, the front frame 206 may comprise a single piece of material, such as a metal, plastic, ceramic, composite material, and so forth. For example, the front frame 206 may comprise 6061 aluminum alloy that has been milled to the desired shape. In other implementations, the front frame 206 may comprise several discrete pieces that are joined together by way of mechanical engagement features, welding, adhesive, and so forth. Also depicted extending from the temples or otherwise hidden from view are earpieces 212 extending from each temple.

In some implementations, the HMWD 106 may include one or more lenses 214. The lenses 214 may have specific refractive characteristics, such as in the case of prescription lenses. The lenses 214 may be clear, tinted, photochromic, electrochromic, and so forth. The lenses 214 may be joined to each other or to a portion of the frame bridge 210 by way of a lens bridge 216. The lens bridge 216 may be located between a left lens 214 (L) and a right lens 214(R). For example, the lens bridge 216 may comprise a member that joins the left lens 214(L) and the right lens 214(R) and affixes to the frame bridge 210. One or more nose pads 218 may be attached to the lens bridge 216. The nose pads 218 aid in the support of the front frame 206 on the nose of the user 102. A lens assembly 220 comprises the lenses 214, the lens bridge 216, and the nose pads 218. In some implementations, the lens assembly 220 may be omitted from the HMWD 106.

In some implementations, the one or more nose pads 218 may be separate from the lens assembly 220. For example, one or more nose pads 218 may be affixed to, or a portion of, the frame bridge 210.

The internal view 204 depicts an outline of the front frame 206 using dotted lines. Arranged within a channel (not shown, see FIG. 5) is a flexible printed circuit (FPC) 222. The FPC 222 allows for an exchange of signals, power, and so forth between the left side and the right side of the front frame 206. For example, the FPC 222 may be used to provide connections for electrical power and data communications between electronics and the left temple and the right temple of the HMWD 106.

In some implementations, the FPC 222 may be substantially planar or flat. The FPC 222 may include one or more of electrical conductors, optical waveguides, radiofrequency waveguides, and so forth. For example, the FPC 222 may include copper traces to convey electrical power or signals, optical fibers to act as optical waveguides and convey light, radiofrequency waveguides to convey radio signals, and so forth. In one implementation, the FPC 222 may comprise a flexible flat cable in which a plurality of conductors are arranged such that they have a substantially linear cross section overall.

The FPC 222 may planar in that the FPC 222 has a substantially linear or rectangular cross section. For example, the electrical conductors or other elements of the FPC 222 may be within a common plane.

The FPC 222 may comprise one or more conductors placed on an insulator. For example, the FPC 222 may comprise electrically conductive ink that has been printed onto a plastic substrate. Conductors used with the FPC 222 may include, but are not limited to, rolled annealed copper, electro deposited copper, aluminum, carbon, silver ink, austenite nickel-chromium alloy, copper-nickel alloy, and so forth. Insulators may include, but are not limited to, polyimide, polyester, screen printed dielectric, and so forth. In one implementation, the FPC 222 may comprise a plurality of electrical conductors laminated to a polyethylene terephthalate film (PET) substrate. In another implementation, the FPC 222 may comprise a plurality of conductors that are lithographically formed onto a polymer film. For example, photolithography may be used to catch or otherwise form copper pathways. In yet another implementation, the FPC 222 may comprise a plurality of conductors that have been printed or otherwise deposited onto a substrate that is substantially flexible.

The FPC 222 may be deemed to be flexible when it is able to withstand one or more of bending around a predefined radius or twisting or torsion at a predefined angle while remaining functional to the intended purpose and without permanent damage. Flexibility may be proportionate to the thickness of the material. For example, PET that is less than 250 micrometers thick may be deemed flexible, while the same PET having a thickness of 5 millimeters may be deemed inflexible.

The FPC 222 may include one or more layers of conductors. For example, a first layer may comprise copper traces to carry electrical power and signals and a second layer may comprise optical fibers to carry light signals.

A retention piece 224 may be placed between the FPC 222 within the channel and the exterior environment. The retention piece 224 may comprise an overmolded component, a channel seal, a channel cover, and so forth. For example, the material comprising the retention piece 224 may be formed into the channel while in one or more of a powder, liquid or semi-liquid state. The material may subsequently harden into a solid or semi-solid shape. Hardening may occur as a result of time, application of heat, light, electric current, and so forth. In another example, the retention piece 224 may be affixed to the channel or a portion thereof using adhesive, pressure, and so forth. In yet another example, the retention piece 224 may be formed within the channel using an additive technique, such as using an extrusion head to deposit a plastic or resin within the channel, a laser to sinter a powdered material, and so forth. The FPC 222 may be maintained within the channel by the retention piece 224. The FPC 222 may also provide protection from environmental contaminants such as dust, water, and so forth.

The retention piece 224 may be sized to retain the FPC 222 within the channel. The retention piece 224 may include one or more engagement features 226. The engagement features 226 may be used to facilitate retention of the retention piece 224 within the channel of the front frame 206. For example, the distal ends of the retention piece 224 may include protrusions configured to engage a corresponding groove or receptacle within a portion of the front frame 206. Instead of, or in addition to the engagement features 226, an adhesive may be used to bond at least a portion of the retention piece 224 to at least a portion of the channel in the front frame 206.

The retention piece 224 may comprise a single material, or a combination of materials. The material may comprise one or more of an elastomer, a polymer, a ceramic, a metal, a composite material, and so forth. The material of the retention piece 224 may be rigid or elastomeric. For example, the retention piece 224 may comprise a metal or a resin. In implementations where the retention piece 224 is rigid, a retention feature such as a tab or slot may be used to maintain the retention piece 224 in place in the channel of the front frame 206. In another example, the retention piece 224 may comprise a silicone plastic, a room temperature vulcanizing rubber, or other elastomer.

The retention piece 224 may comprise a single piece, or several pieces. For example, the retention piece 224 may comprise a single piece produced using injection molding techniques. In some implementations, the retention piece 224 may comprise an overmolded piece.

One or more components of the HMWD 106 may comprise single unitary pieces or may comprise several discrete pieces. For example, the front frame 206 may comprise a single piece, or may be constructed from several pieces joined or otherwise assembled.

Figure 3:
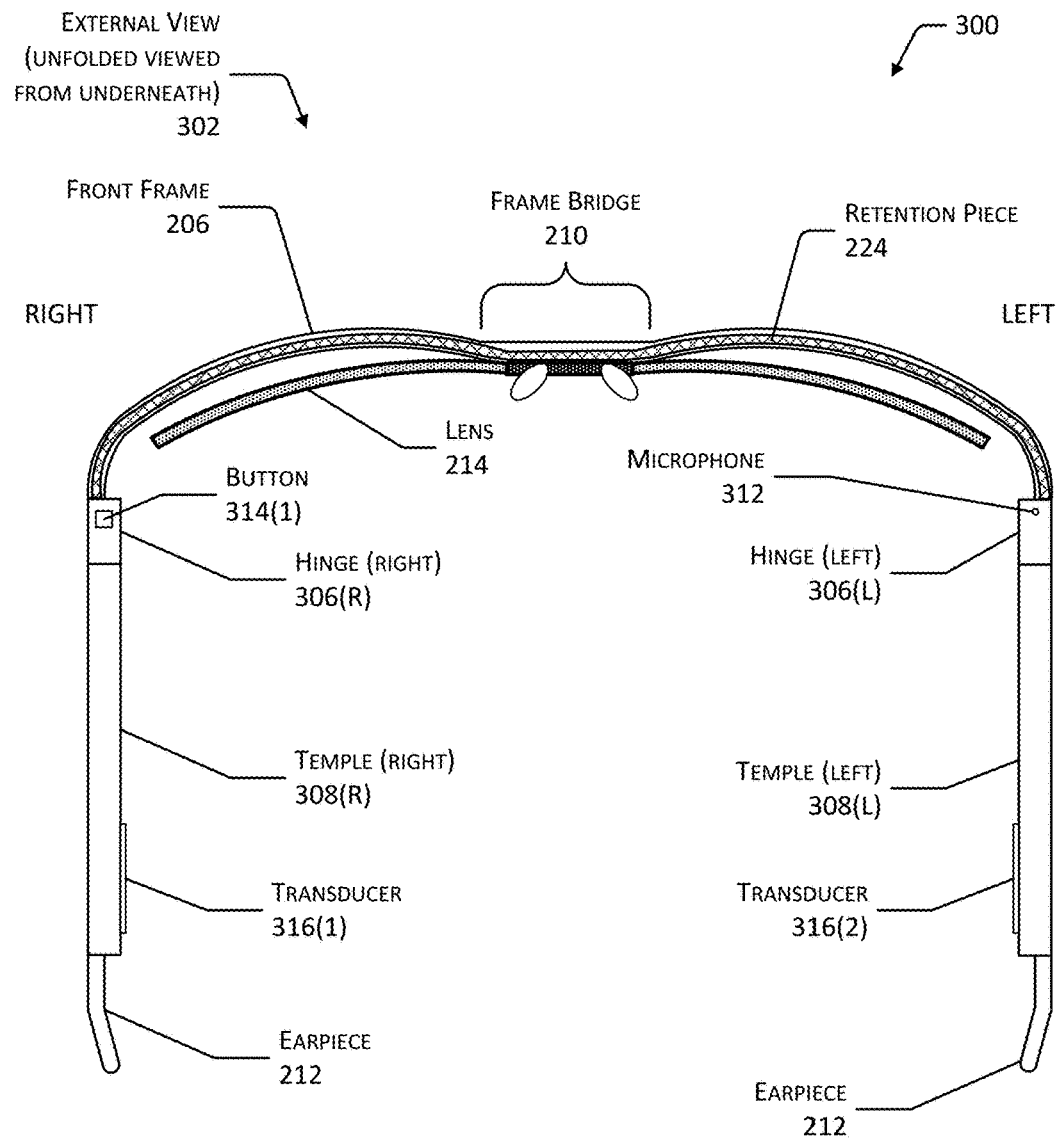
FIG. 3 depicts an exterior view, from below, of the head-mounted wearable device in unfolded and folded configurations, according to some implementations.
Figure 3:
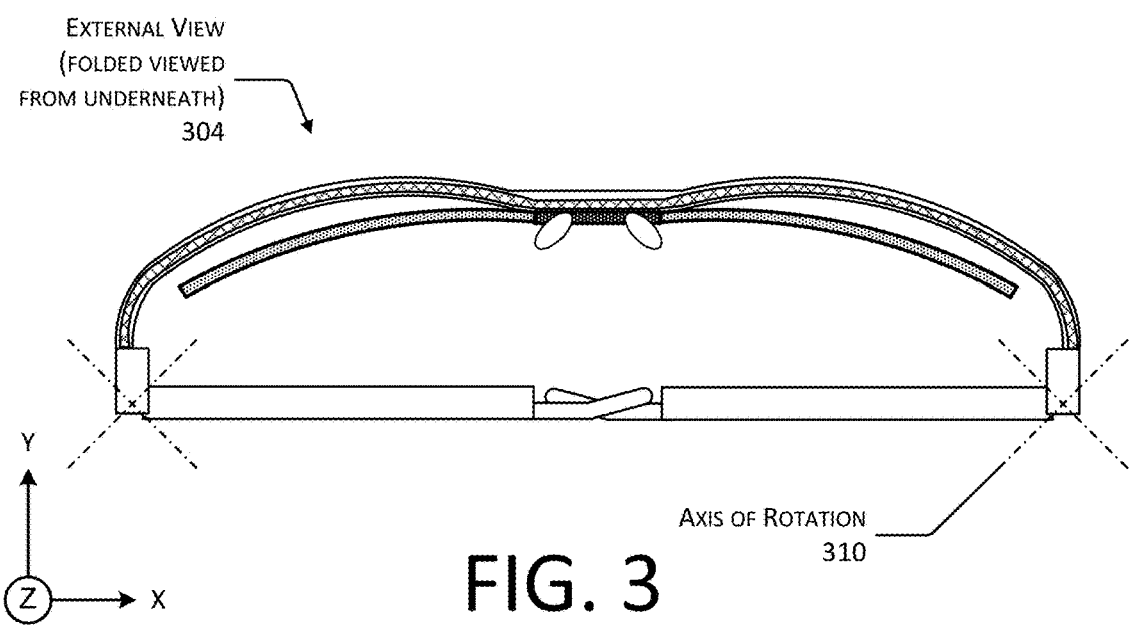

FIG. 3 depicts exterior views 300, from below looking up, of the HMWD 106, including an external view in the unfolded configuration 302 and an external view in the folded configuration 304, according to some implementations. The retention piece 224 that is placed within a channel of the front frame 206 is visible in this view from underneath the HMWD 106.

Also visible in this view are the lenses 214 of the lens assembly 220. Because the lens assembly 220 is affixed to the front frame 206 at the frame bridge 210, the front frame 206 may flex without affecting the positioning of the lenses 214 with respect to the eyes of the user 102. For example, when the head 104 of the user 102 is relatively large, the front frame 206 may flex away from the user's head 104 to accommodate the increased distance between the temples. Similarly, when the head 104 of the user 102 is relatively small, the front frame 206 may flex towards the user's head 104 to accommodate the decreased distance between the temples.

One or more hinges 306 may be affixed to, or an integral part of, the front frame 206. Depicted is a left hinge 306(L) and a right hinge 306(R) on the left and right sides of the front frame 206. The left hinge 306(L) is arranged at the left brow section 208(L), distal to the frame bridge 210. The right hinge 306(R) is arranged at the right brow section 208(R) distal to the frame bridge 210.

A temple 308 may couple to a portion of the hinge 306. For example, the temple 308 may comprise one or more components, such as a knuckle, that mechanically engage one or more corresponding structures on the hinge 306.

The left temple 308(L) is attached to the left hinge 306(L) of the front frame 206. The right temple 308(R) is attached to the right hinge 306(R) of the front frame 206.

The hinge 306 permits rotation of the temple 308 with respect to the hinge 306 about an axis of rotation 310. The hinge 306 may be configured to provide a desired angle of rotation. For example, the hinge 306 may allow for a rotation of between 0 and 120 degrees. As a result of this rotation, the HMWD 106 may be placed into a folded configuration, such as shown at 304. For example, each of the hinges 306 may rotate by about 90 degrees, such as depicted in the external view 304.

One or more different sensors may be placed on the HMWD 106. For example, a microphone 312 may be emplaced within or proximate to the left hinge 306(L), such as on the underside of the left hinge 306(L). One or more buttons 314 may be placed in other locations on the HMWD 106. For example, a button 314(1) may be emplaced within, or proximate to, the right hinge 306(R), such as on an underside of the right hinge 306(R).

One or more transducers 316 may be emplaced on the temples 308. For example, as depicted here a transducer 316(1) may be located on the surface of the right temple 308(R) that is proximate to the head 104 of the user 102 during use. Continuing the example, as depicted here a transducer 316(2) may be located on the surface of the left temple 308(L) that is proximate to the head 104 of the user 102 during use. The transducer 316 may be configured to generate acoustic output. For example, the transducer 316 may comprise a speaker that provides audio to the user 102 via bone conduction through the temporal bone of the head 104.

Extending from a portion of the temple 308 that is distal to the front frame 206, is the earpiece 212. The earpiece 212 may comprise a material that may be reshaped to accommodate the anatomy of the head 104. For example, the earpiece 212 may comprise a thermoplastic that may be warmed to a predetermined temperature and reshaped. In another example, the earpiece 212 may comprise a wire that may be bent to fit. The wire may be encased in an elastomeric material.

Figure 4:
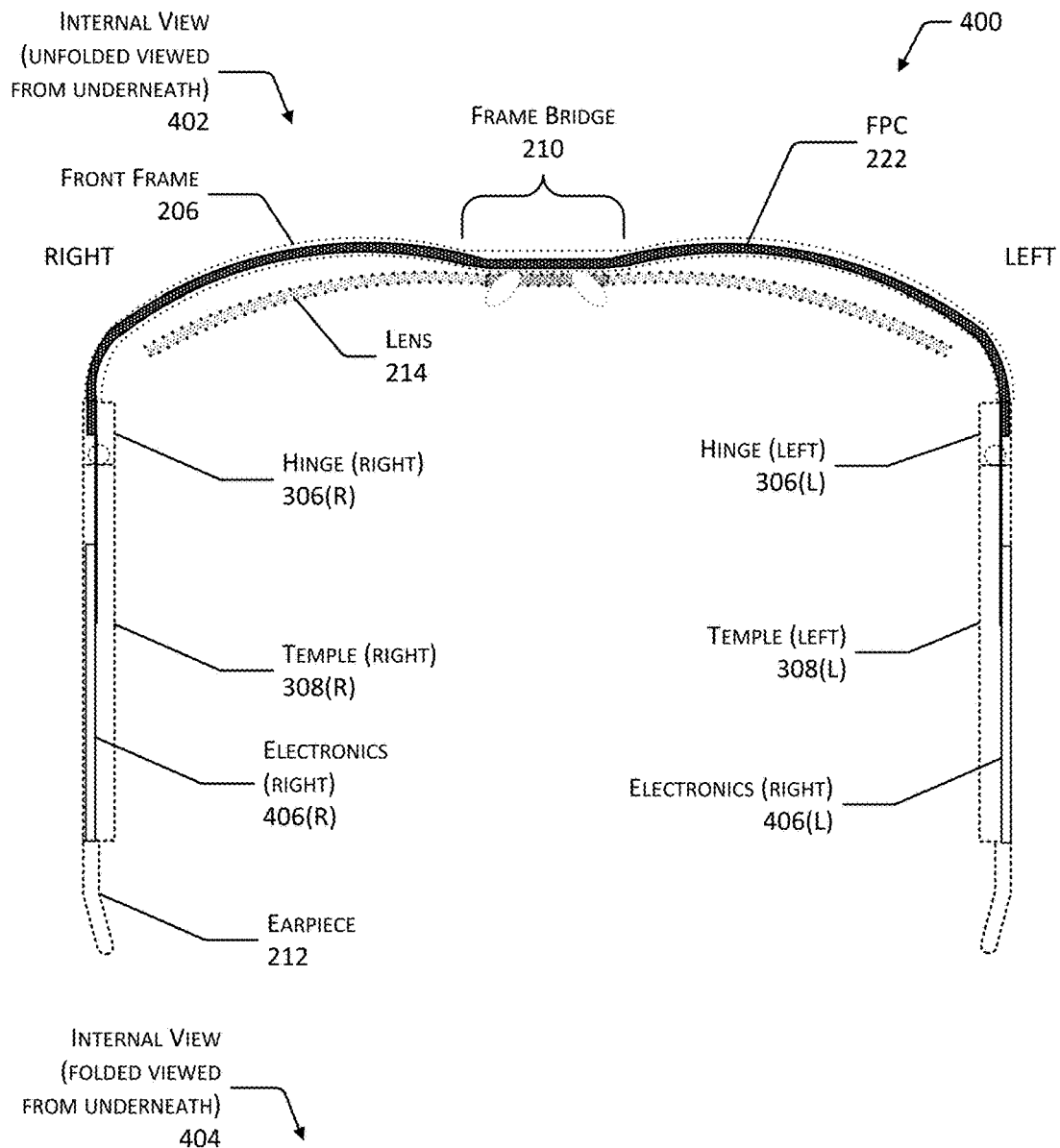
FIG. 4 depicts an internal view from below of some of the components of the head-mounted wearable device in unfolded and folded configurations, according to some implementations.

FIG. 4 depicts internal views 400 from below of some of the components of the HMWD 106 in unfolded 402 and folded 404 configurations, according to some implementations. The internal views 400 depict an outline of the front frame 206 and other components such as the hinges 306, temple 308, lenses 214, and so forth using dotted lines.

In this illustration, the retention piece 224 has been omitted, allowing the FPC 222 to be visualized within its channel. The FPC 222 provides connectivity between the electronics 406 in the temples. For example, the left temple 308(L) may include electronics 406(L) such as a hardware processor while the right temple 308(R) may include electronics 406(R) such as a battery. The FPC 222 provides a pathway for control signals from the hardware processor to the battery, may transfer electrical power from the battery to the hardware processor, and so forth. The FPC 222 may provide additional functions such as providing connectivity to the microphone 312, the button 314(1), components within the front frame 206, and so forth. For example, a front facing camera may be mounted within the frame bridge 210 and may be connected to the FPC 222 to provide image data to the hardware processor in the temple 308.

Figure 5:
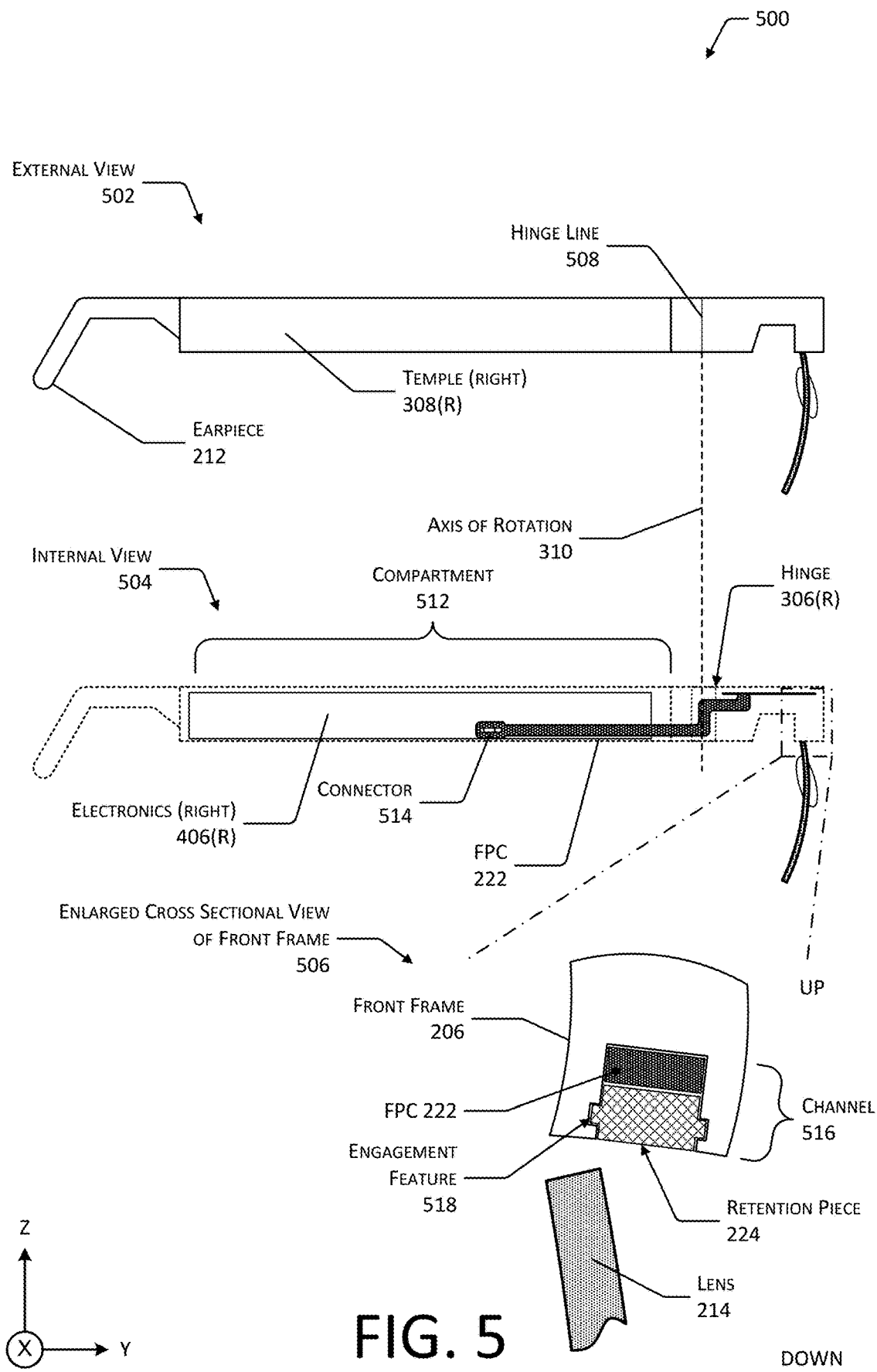
FIG. 5 depicts exterior and interior side views of some of the components of the head-mounted wearable device, according to some implementations.

FIG. 5 depicts views 500 of some of the components of the HMWD 106, according to some implementations. An external view 502 and an internal view 504 of the right side of the HMWD 106 are shown. Also shown is an enlarged cross sectional view 506 of the front frame 206.

The external view 502 depicts the hinge line 508. The hinge line 508 is the external feature that parallels the axis of rotation 310.

The internal view 504 depicts the FPC 222 passing from the front frame 206 through the hinge 506 and into a compartment 512 of the temple 308. The compartment 512 may house the electronics 406 or other devices within the temple 308. The FPC 222 may couple to a connector 514 located on the electronics 406. The connector 514 may comprise pads, pogo pins, or other connection mechanisms.

In the enlarged cross sectional view 506 of the front frame 206, the channel 516 is depicted. The channel 516 may have a substantially rectangular cross section as depicted here. In other implementations, the channel 516 may employ other cross sectional shapes.

The channel 516 may extend contiguously along the front frame 206 from the left hinge 306(L) to the right hinge 306(R). For example, the channel 516 may extend along the path indicated by the FPC 222 in FIG. 4, from the left hinge 306(L), across the left brow section 208(L), across the frame bridge 210, across the right brow section 208(R), and to the right hinge 306(R).

The FPC 222 may be emplaced within the channel 516, and the retention piece 224 may be used to retain the FPC 222 within the channel 516. For example, during assembly the front frame 206 may be placed upside down, the FPC 222 may be laid within, and the retention piece 224 may be inserted.

The channel 516 may have a width sufficient to accommodate the width of the FPC 222. For example, the channel 516 may be 2.1 millimeters wide to accommodate an FPC that is 2 mm wide.

In the implementation depicted here, the channel 516 is arranged with its opening generally downward, such as along the underside of the front frame 206. In other implementations, the channel 516 may be directed in other directions. For example, the channel 516 may be directed generally toward the head 104 of the user 102, away from the head 104 the user 102, and so forth.

The channel 516 may include one or more engagement features 518. For example, the channel 516 may be formed to include lips, ridges, grooves, prongs, teeth, and so forth. These engagement features 518 may be used to retain the retention piece 224 within the channel 516. In some implementations, the retention piece 224 may include one or more engagement features 518. These engagement features 518 may be configured to accommodate complementary features within the channel 516. For example, the channel 516 may have an engagement feature 518 comprising a groove as illustrated here while the retention piece 224 has a corresponding engagement feature 226 comprising a ridge that fits within the groove. The engagement features 226 or 518 may be placed at discrete points within the channel 516. For example, the engagement features 226 of the retention piece 224 may be arranged at the ends of the retention piece 224 proximate to the hinges 306.

Figure 6:
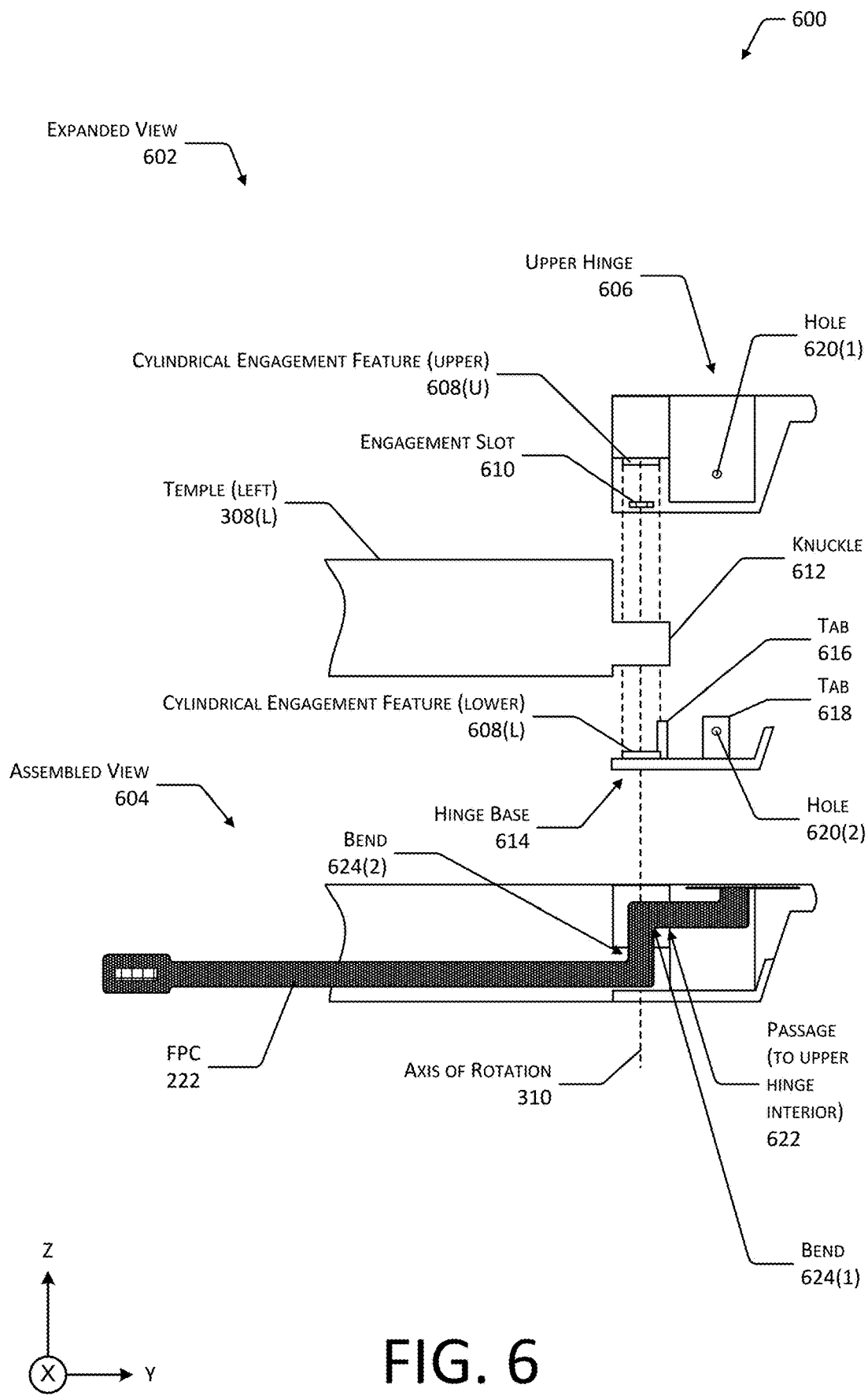
FIG. 6 depicts an enlarged view of some components of a hinge and a flexible printed circuit (FPC) passing through the hinge, according to some implementations.

FIG. 6 depicts an enlarged view 600 of some components of a hinge 306 and the FPC 222 passing through the hinge 306, according to some implementations. Depicted is an expanded view 602 and an assembled view 604.

In the expanded view 602 an upper hinge 606 is depicted. In some implementations, the upper hinge 606 may be a component separate from the front frame 206, or may be an integral portion of the front frame. For example, the upper hinge 606 may be machined from the same block of material and may be unitary with the front frame 206.

The upper hinge 606 may have a cylindrical engagement feature 608(U). A cylindrical engagement feature 608 may have an opening in its interior, providing an open core through which the FPC 222 may be routed. The open core may comprise a hole or passageway that is within the perimeter of the cylindrical engagement feature 608. In some implementations the opening may be centered, or may be off center. The cross section of the open core may be circular, square, elliptical, or any other regular polygon or irregular shape. The upper hinge 606 may also include an engagement slot 610 or other engagement features.

The temple 308 may include a knuckle 612. The knuckle 612 comprises a protrusion extending from or attached to the temple 308. The knuckle 612 also includes an open core through which the FPC 222 may be routed. The open core of the knuckle 612 is sized to mechanically engage the cylindrical engagement feature 608. For example, the open core may have an inner diameter that is slightly larger than an outer diameter of the cylindrical engagement feature 608.

The hinge base 614 may also include a cylindrical engagement feature 608(L) configured to engage the open core of the knuckle 612 at an end opposite the upper hinge 606. The hinge base 614 may include one or more engagement features that may be used to affix the hinge base 614 to the upper hinge 606. For example, the hinge base 614 may include a tab 616. The hinge base 614 may include another tab 618 through which a hole 620 has been formed. In some implementations, the hinge 306 may include the upper hinge 606 and the hinge base 614.

The assembled view 604 depicts the HMWD 106 in the unfolded configuration. In the assembled view 604, the knuckle 612 has been retained between the cylindrical engagement feature 608(U) of the upper hinge 606 and the cylindrical engagement feature 608(L) of the hinge base 614. Many different engagement features or techniques may be used to join the upper hinge 606 and the hinge base 614. In one technique illustrated here, the tab 616 may be configured to enter a receptacle in the upper hinge 606. In some implementations, the receptacle on the upper hinge 606 may be adhesive line, filled with an adhesive, and so forth. In another technique illustrated here, the upper hinge 606 further includes a first hole 620(1), while the hinge base 614 further includes a tab 618 having a second hole 620(2). A threaded fastener, such as a screw, may be passed through the first hole 620(1) and the second hole 620(2) to join the upper hinge 606 and the hinge base 614. In yet another technique illustrated here, a tab or protrusion (not shown) extending from the hinge base 614 may be configured to engage the engagement slot 610 of the upper hinge 606.

The FPC 222 as illustrated in the assembled view 604 may be routed through passage 622 that extends from the interior of the upper hinge 606 into the open core of the cylindrical engagement feature 608(U) of the upper hinge 606. At this transition from the passage 622 down towards the knuckle 612, the FPC 222 may have an approximately right angle first bend 624(1). The FPC 222 may have an approximately right angle second bend 624(2) at the transition from the interior of the open core of the knuckle 612 through slot into the compartment 512 of the temple 308. The portion of the FPC 222 extending from the first bend 624(1) to the second bend 624(2) may have a long axis that is approximately parallel to the axis of rotation 310.

During rotation about the axis of rotation 310, the FPC 222 extending through the open core of the hinge 306 experiences the torsion or twisting. In some implementations, the angular displacement between the FPC 222 at the first bend 624(1) and the second bend 624(2) may range from 0 degrees in the unfolded configuration to less than 120 degrees in the folded configuration.

The path followed by the FPC 222 may extend from a left compartment 512(L) through a left slot in the left compartment 512(L) into the open core of the left knuckle 612(L), through the left upper cylindrical engagement feature 608 (U), through the left upper hinge 606(L), along the channel 516, through the right upper hinge 606(R), through the open core of the right upper cylindrical engagement feature 608(U), through the open core of the right temple knuckle 612, through the right slot into the right compartment 512(R).

In some implementations, the knuckle 612 may not have a passage that extends completely through. For example, the open core may extend from an upper portion of the knuckle to a point below the slot. A recess that is cylindrical in cross section may then extend from the bottom of the knuckle 612 upwards. Thus, the open core may include a wall or partition may divide the core of the knuckle 612 into two sections, an upper section and a lower section. The FPC 222 may pass through the upper section, and the upper section may engage the upper cylindrical engagement feature 608(U) while the lower section may engage the lower cylindrical engagement feature 608(L).

In some implementations, the hinge base 614 may be omitted. For example, the knuckle 612 may be configured to couple to the upper hinge 606.

The FPC 222 may be constructed to pass through the slot, the open core, the channel 516, and so forth. For example, the FPC 222 may be constructed with a first dimension, such as width, that is less than or equal to a diameter of the open core of the knuckle 612 and a second dimension (such as thickness) that is less than or equal to a height of the slot.

Figure 7:
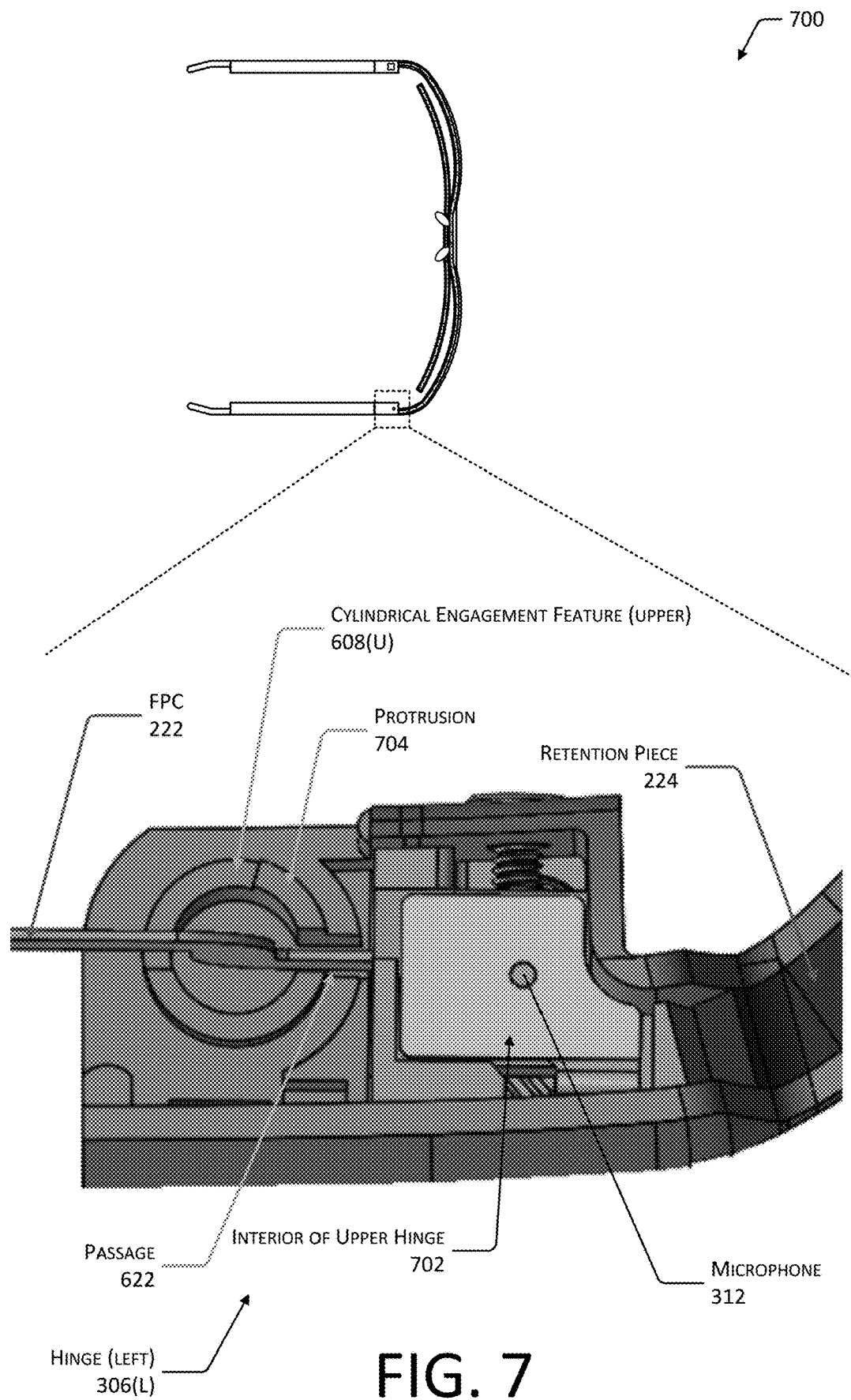
FIG. 7 depicts an enlarged view from below the hinge, according to some implementations.

FIG. 7 depicts an enlarged view 700 of the left hinge 306(L) from below, according to some implementations. In this illustration, the retention piece 224 is visible. The FPC 222 within the channel 516 is covered by the retention piece 224 in this illustration. Also depicted is the microphone 312.

The FPC 222 is visible almost edge on, depicted here generally along the Z-Y plane such as shown in FIG. 3. The FPC 222 passes through the open core of the cylindrical engagement feature 608(U) and through the passage 622 into the interior of the upper hinge 702. Within the interior of the upper hinge 702 the FPC 222 may experience a bend of approximately 90° to allow for the passage of FPC 222 into the channel 516.

The cylindrical engagement feature 608 may include one or more protrusions 704. The protrusions 704 may extend from a circular perimeter that is perpendicular to the axis of rotation 310 of the hinge 306. These protrusions 704 are configured to fit within an open core of the knuckle 612. The one or more protrusions 704 may extend parallel to the axis of rotation 310. For example, the protrusion 704 on the cylindrical engagement feature 608(U) may extend down towards the knuckle 612. The one or more protrusions 704 may occupy less than the entire circular perimeter. For example, the protrusions 704 may have an opening to provide passages for the FPC 222 to enter or exit the open core of the hinge 306. In some implementations, the protrusions 704 of the upper cylindrical engagement feature 608(U) may comprise a plurality of crenellations arranged asymmetrically around the perimeter of the cylindrical engagement feature 608(U). For example, the crenellations may comprise a plurality of segmented features separated by notches or gaps that are arranged asymmetrically around the perimeter of the cylindrical engagement feature 608 (U). The segmented features extend away from a body of the upper hinge 606.

In some implementations, the microphone 312 may utilize one or more electrical conductors of the FPC 222. For example, a portion of the FPC 222 may be routed within the interior of the upper hinge 702 to allow for positioning of the microphone 312 at the underside of the hinge 306.

Figure 8:
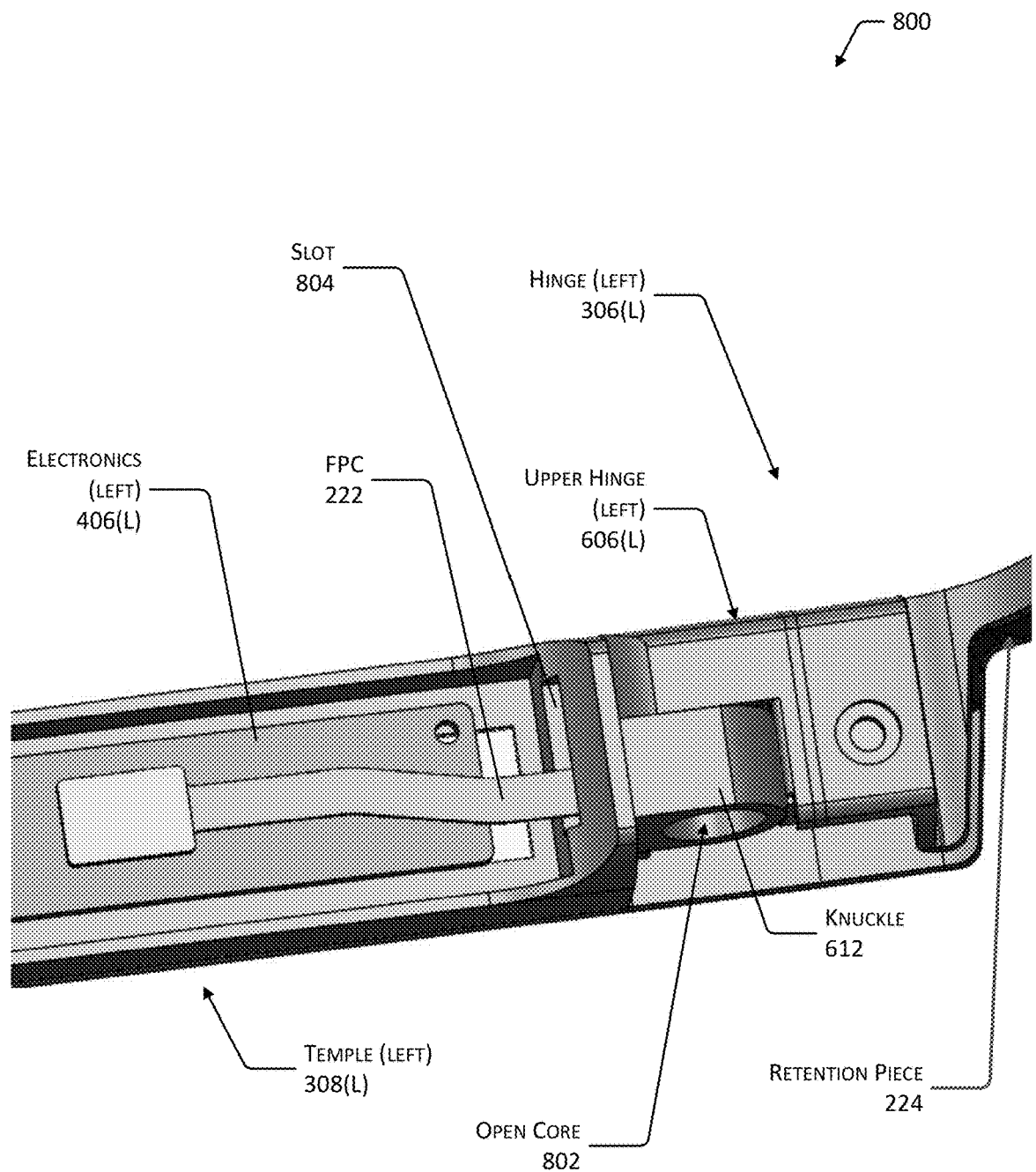
FIG. 8 depicts a view of a portion of the hinge and a portion of a temple, according to some implementations.

FIG. 8 depicts a view 800 of a portion of the left hinge 306(L) and a portion of the left temple 308(L), according to some implementations. In this illustration, the upper hinge 606 is proximate to the knuckle 612 with the cylindrical engagement feature 608(U) engaging an upper portion of an open core 802 of the knuckle 612. The hinge base 614 has been omitted for clarity.

A slot 804 is depicted in the temple 308. The slot 804 extends from the compartment 512 within the temple 308 through to an interior of the open core 802 of the knuckle 612. The FPC 222 may pass from the left hinge 306(L) to the right hinge 306(R) through the open core of the upper cylindrical engagement feature 608(U) of the hinges 306, through the open cores 802 of the knuckles 612, and the slots 804.

Figure 9:
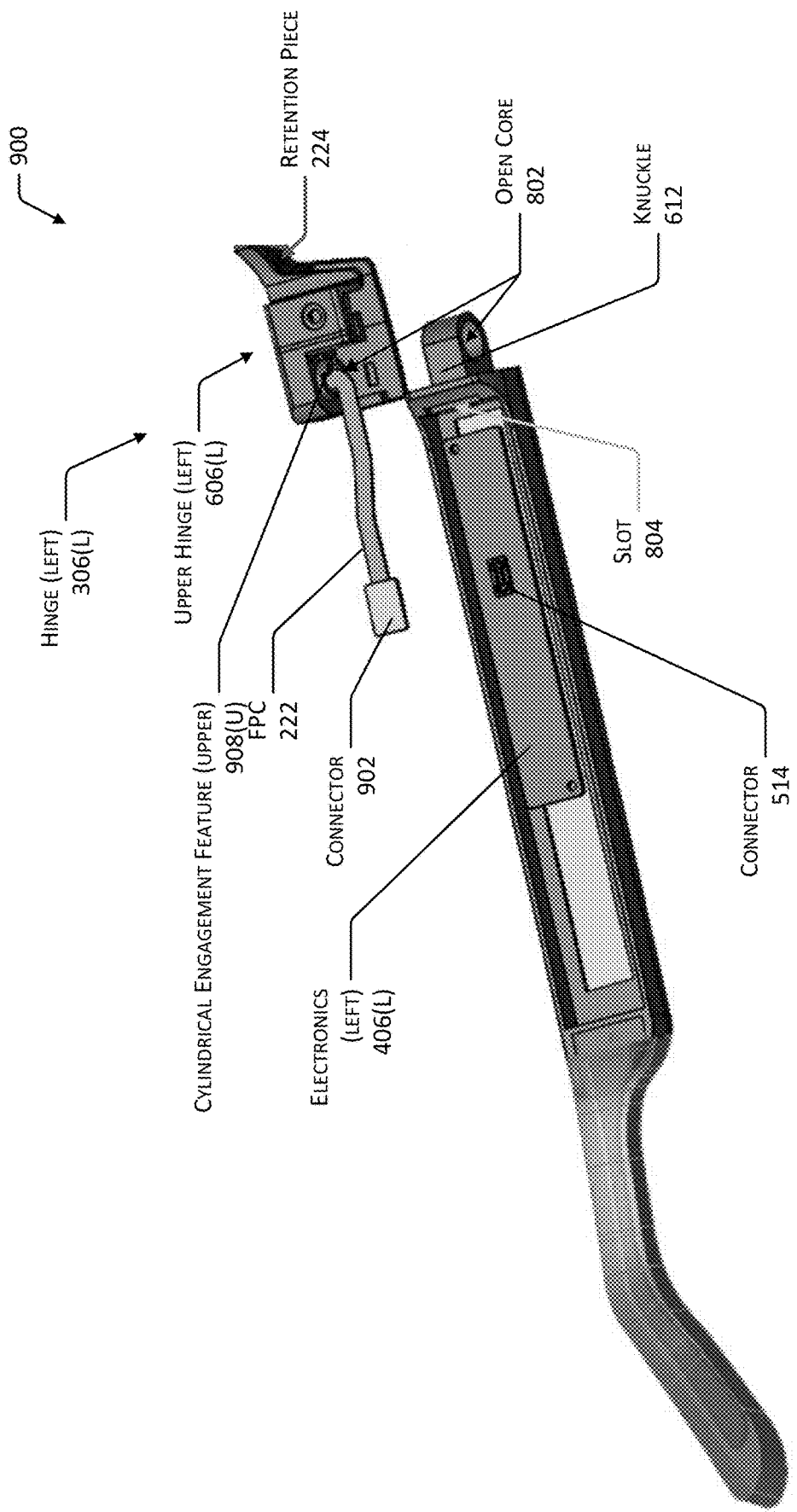
FIG. 9 depicts an exploded view of the hinge and a portion of the temple, according to some implementations.

FIG. 9 depicts an exploded view 900 of the left hinge 306(L) and a portion of the temple 308, according to some implementations. In this illustration, a connector 902 at the end of the FPC 222 is depicted. For example, the connector 902 may comprise pads that are engaged by the connector 514 of the PCB of the electronics 406.

Also depicted is the open core 802 of the cylindrical engagement feature 608(U) of the upper hinge 606 and the knuckle 612.

Figure 10:
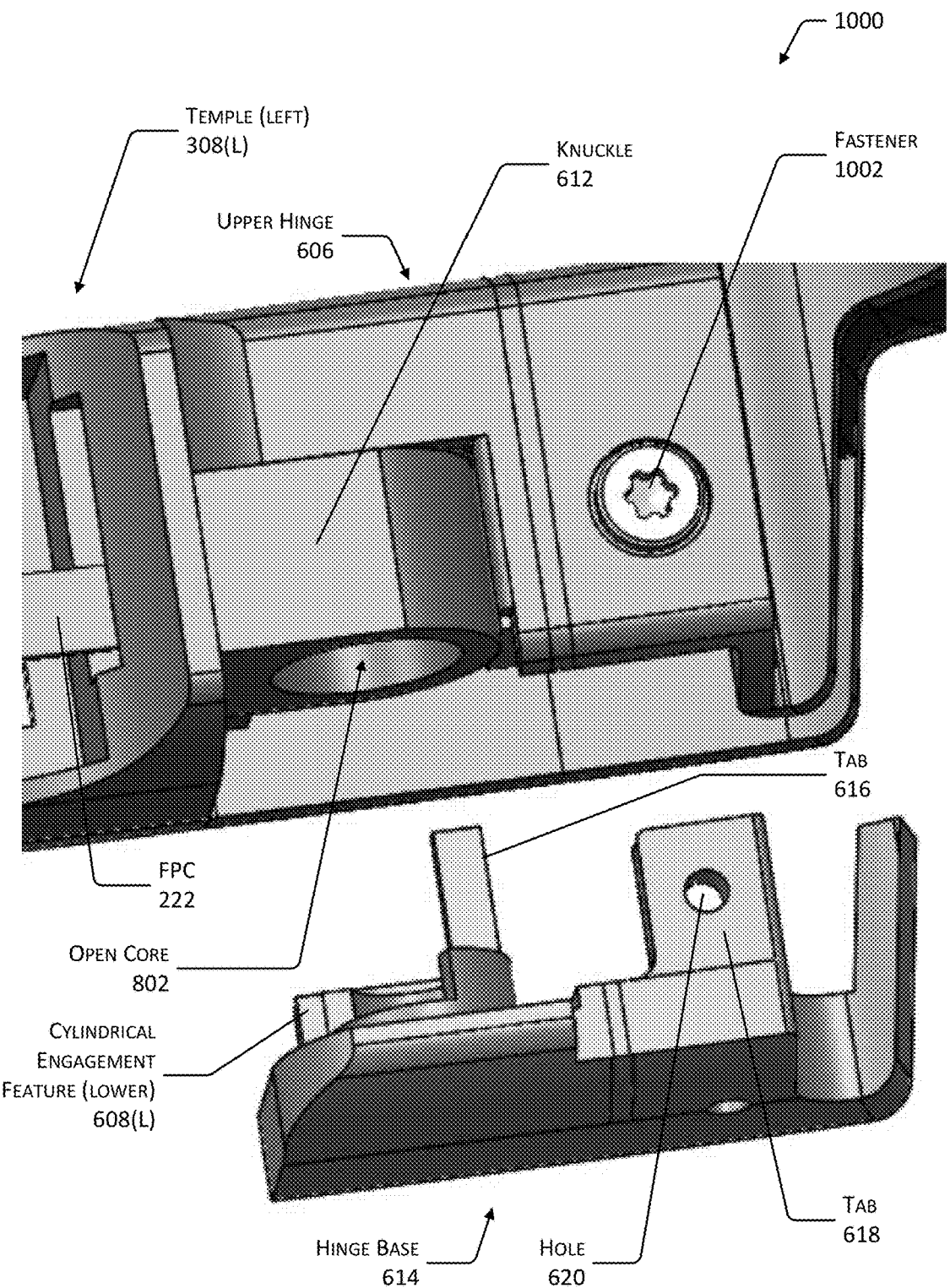
FIG. 10 depicts an enlarged view of the hinge and a portion of the temple prior to assembly, according to some implementations.

FIG. 10 depicts an enlarged view 1000 of the hinge 306 and a portion of the temple 308 prior to assembly of the hinge base 614, according to some implementations. In this illustration, the hinge base 614 is lined up and shown prior to insertion into the upper hinge 606. The cylindrical engagement feature 608(L) fits within the open core 802 of the knuckle 612. In these illustrations, the cylindrical engagement feature 608(U) and 608(L) are depicted as having a common diameter. In other implementations, the diameter of the open core of the knuckle 612 may vary. For example, the diameter of the cylindrical engagement feature 608(U) may be greater than the diameter of the cylindrical engagement feature 608(L), with the internal diameter of the open core 802 of the knuckle 612 having corresponding diameters at the top and bottom respectively.

A fastener 1002 may be inserted as shown after the hinge base 614 has been inserted into the upper hinge 606, to mechanically engage the two pieces.

Figure 11:
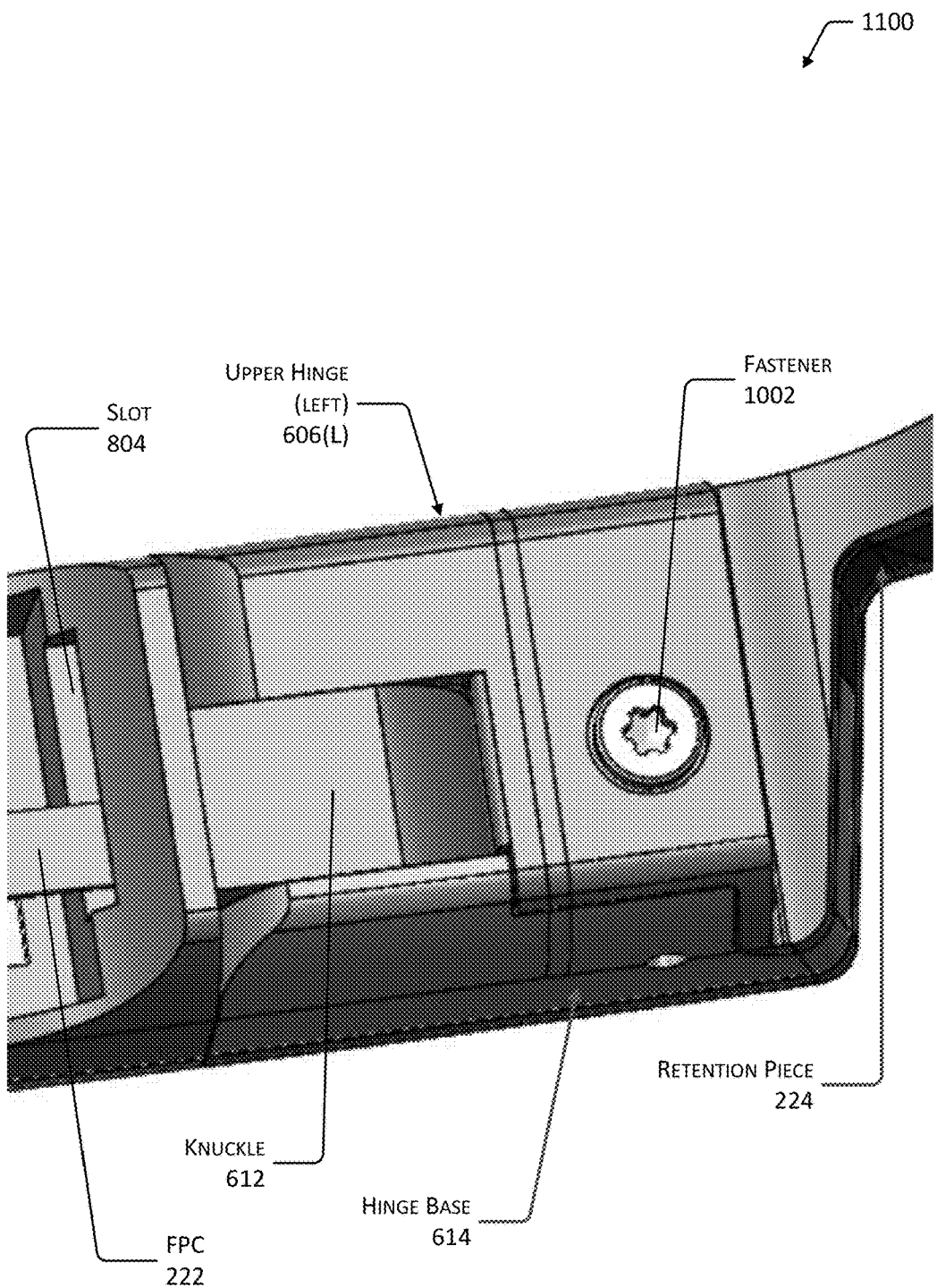
FIG. 11 depicts an enlarged view of the assembled hinge and a portion of the temple, according to some implementations.

FIG. 11 depicts an enlarged view 1140 of the assembled hinge 306 and a portion of the temple 308, according to some implementations. In this illustration, a portion of the housing of the temple 308 has been omitted to permit the FPC 222 to be seen passing through the slot 804 from the open core 802 of the knuckle 612 and into the compartment 512. When finally assembled, the FPC 222 may be completely concealed behind the protective housing of the temple 308.

Figure 12:
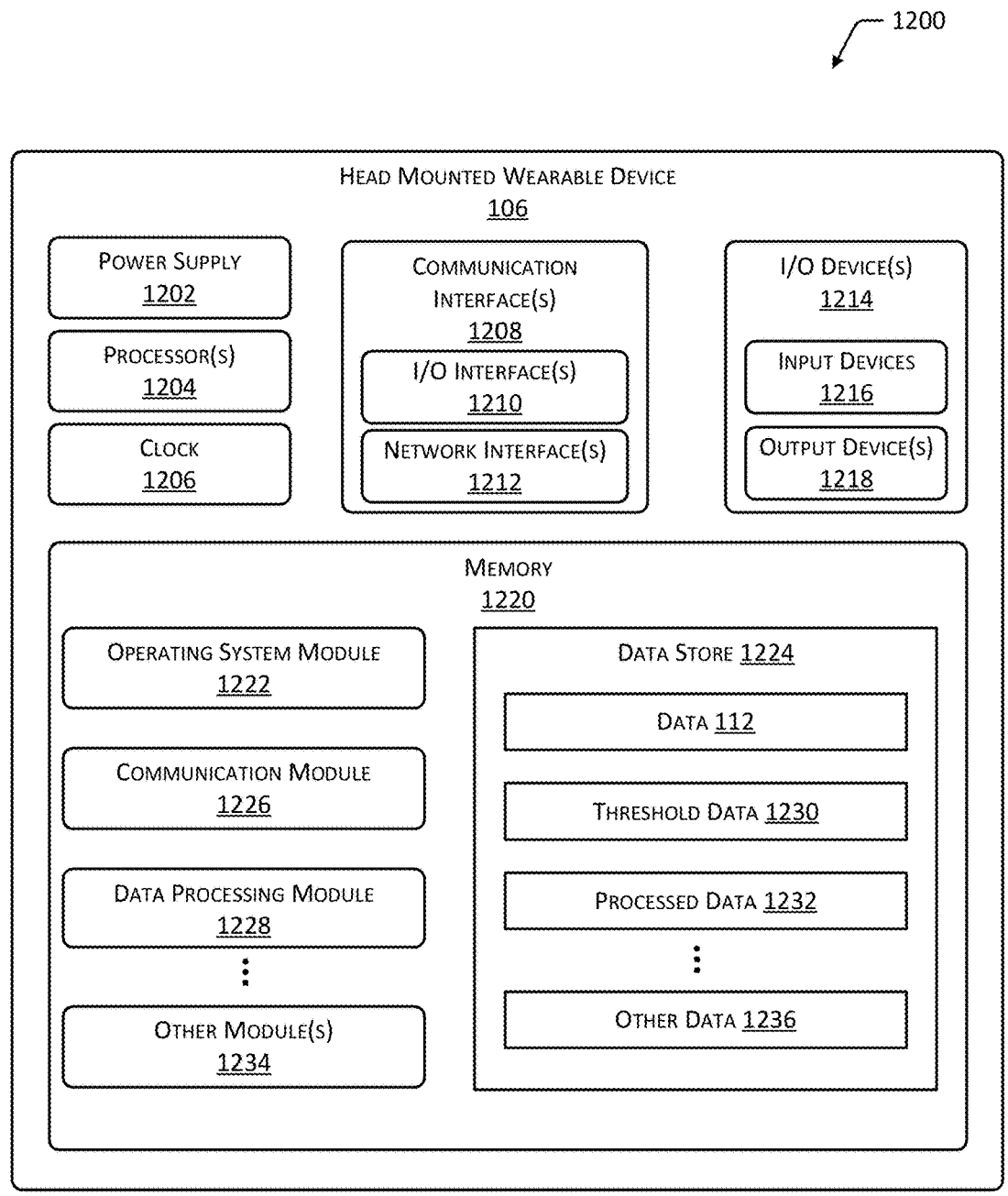
FIG. 12 is a block diagram of electronic components of the head-mounted wearable device, according to some implementations.

FIG. 12 is a block diagram 1200 of electronic components of the HMWD 106, according to some implementations.

One or more power supplies 1202 may be configured to provide electrical power suitable for operating the components in the HMWD 106. The one or more power supplies 1202 may comprise batteries, capacitors, fuel cells, photovoltaic cells, wireless power receivers, conductive couplings suitable for attachment to an external power source such as provided by an electric utility, and so forth. For example, the batteries on board the HMWD 106 may be charged wirelessly, such as through inductive power transfer. In another implementation, electrical contacts may be used to recharge the HMWD 106.

The HMWD 106 may include one or more hardware processors 1204 (processors) configured to execute one or more stored instructions. The processors 1204 may comprise one or more cores. One or more clocks 1206 may provide information indicative of date, time, ticks, and so forth. For example, the processor 1204 may use data from the clock 1206 to associate a particular interaction with a particular point in time.

The HMWD 106 may include one or more communication interfaces 1208 such as input/output (I/O) interfaces 1210, network interfaces 1212, and so forth. The communication interfaces 1208 enable the HMWD 106, or components thereof, to communicate with other devices or components. The communication interfaces 1208 may include one or more I/O interfaces 1210. The I/O interfaces

1210 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1210 may couple to one or more I/O devices 1214. The I/O devices 1214 may include input devices 1216 such as one or more sensors, buttons, and so forth. The I/O devices 1214 may also include output devices 1218 such as one or more of a display screen, display lights, audio speakers, and so forth. In some embodiments, the I/O devices 1214 may be physically incorporated with the HMWD 106 or may be externally placed. The output devices 1218 are configured to generate signals, which may be perceived by the user 102 or may be detected by sensors.

One example of output devices 1218 are haptic output devices 1218(1), which are configured to provide a signal that results in a tactile sensation to the user 102. The haptic output devices 1218(1) may use one or more mechanisms such as electrical stimulation or mechanical displacement to provide the signal. For example, the haptic output devices 1218(1) may be configured to generate a modulated electrical signal, which produces an apparent tactile sensation in one or more fingers of the user 102. In another example, the haptic output devices 1218(1) may comprise piezoelectric or rotary motor devices configured to provide a vibration, which may be felt by the user 102.

Another example of output devices 1218 are audio output devices 1218(2), which may be configured to provide acoustic output. The acoustic output includes one or more of infrasonic sound, audible sound, or ultrasonic sound. The audio output devices 1218(2) may use one or more mechanisms to generate the acoustic output. These mechanisms may include, but are not limited to, the following: voice coils, piezoelectric elements, magnetotrictive elements, electrostatic elements, and so forth. For example, a piezoelectric buzzer or a speaker may be used to provide acoustic output. The acoustic output may be transferred by the vibration of intervening gaseous and liquid media, such as adding air, or by direct mechanical conduction. For example, an audio output device 1218(2) located within the temple 308 may provide an audio signal to the user of the HMWD 106 by way of bone conduction to the user's skull, such as the mastoid process or temporal bone. In some implementations the speaker or sound produced therefrom may be placed within the ear of the user, or may be ducted towards the ear of the user.

Yet another example of output devices 1218 are display devices 1218(3), which may be configured to provide output, which may be seen by the user 102 or detected by a light-sensitive sensor such as a camera or an optical sensor. In some implementations, the display devices 1218(3) may be configured to produce output in one or more of infrared, visible, or ultraviolet light. The output may be monochrome or color.

The display devices 1218(3) may be emissive, reflective, or both. An emissive display device 1218(3), such as using light emitting diodes (LEDs), is configured to emit light during operation. In comparison, a reflective display device 1218(3), such as using an electrophoretic element, relies on ambient light to present an image. Backlights or front lights may be used to illuminate non-emissive display devices 1218(3) to provide visibility of the output in conditions where the ambient light levels are low.

The display devices 1218(3) may include, but are not limited to, micro-electromechanical systems (MEMS), spatial light modulators, electroluminescent displays, quantum dot displays, liquid crystal on silicon (LCOS) displays, cholesteric displays, interferometric displays, liquid crystal displays (LCDs), electrophoretic displays, and so forth. For example, the display device 1218(3) may use a light source and an array of MEMS-controlled mirrors to selectively direct light from the light source to produce an image. These display mechanisms may be configured to emit light, modulate incident light emitted from another source, or both. The display devices 1218(3) may operate as panels, projectors, and so forth.

The display devices 1218(3) may include image projectors. For example, the image projector may be configured to project an image onto a surface or object, such as the lens 214. The image may be generated using MEMS, LCOS, lasers, and so forth.

Other display devices 1218(3) may also be used by the HMWD 106. Other examples of output devices 1218, such as other output devices 1218(P), may also be present. For example, the other output devices 1218(P) may include scent/odor dispensers.

The network interfaces 1212 may be configured to provide communications between the HMWD 106 and other devices, such as the server 116. The network interfaces 1212 may include devices configured to couple to personal area networks (PANs), local area networks (LANs), wide area networks (WANs), and so forth. For example, the network interfaces 1212 may include devices compatible with Ethernet, Wi-Fi, Bluetooth, Bluetooth Low Energy, ZigBee, and so forth.

The HMWD 106 may also include one or more busses or other internal communications hardware or software that allow for the transfer of data between the various modules and components of the HMWD 106.

As shown in FIG. 12, the HMWD 106 includes one or more memories 1220. The memory 1220 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1220 provides storage of computer-readable instructions, data structures, program modules, and other data for the operation of the HMWD 106. A few example functional modules are shown stored in the memory 1220, although the same functionality may alternatively be implemented in hardware, firmware, or as a system on a chip (SoC).

The memory 1220 may include at least one operating system (OS) module 1222. The OS module 1222 is configured to manage hardware resource devices such as the I/O interfaces 1210, the I/O devices 1214, the communication interfaces 1208, and provide various services to applications or modules executing on the processors 1204. The OS module 1222 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 1220 may be a data store 1224 and one or more of the following modules. These modules may be executed as foreground applications, background tasks, daemons, and so forth. The data store 1224 may use a flat file, database, linked list, tree, executable code, script, or other data structure to store information. In some implementations, the data store 1224 or a portion of the data store

1224 may be distributed across one or more other devices including servers, network attached storage devices, and so forth.

A communication module 1226 may be configured to establish communications with one or more of the other HMWDs 106, servers, sensor, or other devices. The communications may be authenticated, encrypted, and so forth.

The memory 1220 may store data processing module 1228. The data processing module 1228 may provide one or more of the functions described herein. For example, the data processing module 1228 may be configured to awaken the HMWD 106 from a sleep state, perform natural language processing, and so forth.

The data processing module 1228 may utilize one or more of the data 112 or threshold data 1230 during operation. The threshold data 1230 may specify one or more thresholds, such as permissible tolerances or variances. The data processing module 1228 or other modules may generate processed data 1232. For example, the processed data 1232 may comprise a transcription of audio spoken by the user 102, image data to present, and so forth.

Techniques such as artificial neural networks (ANN), active appearance models (AAM), active shape models (ASM), principal component analysis (PCA), cascade classifiers, and so forth, may also be used to process the data 112. For example, the ANN may be trained using a supervised learning algorithm such that particular sounds or changes in orientation of the user's head to associate with particular actions to be taken. Once trained, the ANN may be provided with the data 112 and provide, as output, a transcription of the words spoken by the user, orientation of the user's head, and so forth. In some implementations the data 112 may comprise image data. For example, cascade classifiers may be used for facial recognition, such as the Viola-Jones face detection.

Other modules 1234 may also be present in the memory 1220 as well as other data 1236 in the data store 1224. For example, the other modules 1234 may include a contact management module while the other data 1236 may include address information associated with a particular contact, such as an email address, telephone number, network address, uniform resource locator, and so forth.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Specific physical embodiments as described in this disclosure are provided by way of illustration and not necessarily as a limitation. Those having ordinary skill in the art readily recognize that alternative implementations, variations, and so forth may also be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features, structures, and acts are disclosed as exemplary forms of implementing the claims.

What is claimed is:

1. A head-mounted wearable device comprising:
    a front frame comprising:
        a left brow section,
        a right brow section, and
        a frame bridge joining the left brow section and the right brow section;
    a left upper hinge affixed to the left brow section distal to the frame bridge;
    a right upper hinge affixed to the right brow section distal to the frame bridge;
    a channel extending along an underside of the front frame from the left upper hinge to the left brow section to the frame bridge to the right brow section to the right upper hinge;
    wherein each upper hinge comprises:
        an upper cylindrical engagement feature including an open core, and
        a receptacle;
    the head-mounted wearable device further comprising a left hinge base and a right hinge base, each hinge base comprising:
        a lower cylindrical engagement feature, and
        a tab to insert into the receptacle of the upper hinge;
    a left temple and a right temple, each temple comprising:
        a knuckle comprising an open core to accept the upper cylindrical engagement feature and the lower cylindrical engagement feature of a respective hinge,
        a compartment, and a slot extending from the compartment to an interior of the open core of the knuckle; and a flexible printed circuit (FPC) comprising a plurality of electrical conductors and arranged to pass from:

a left temple compartment through the left temple slot in the left temple compartment into the open core of the left temple knuckle, through the left upper cylindrical engagement feature via a first right angle bend, through the left upper hinge via a second right angle bend, along the channel, through the right upper hinge via a third right angle bend, through the open core of the right upper cylindrical engagement feature via a fourth right angle bend, through the open core of the right temple knuckle, and through the right temple slot into the right temple compartment.

2. The head-mounted wearable device of claim 1, wherein the upper cylindrical engagement feature comprises a plurality of protrusions separated by notches, the protrusions arranged asymmetrically around a perimeter.

3. The head-mounted wearable device of claim 1, wherein a first dimension of the FPC is less than or equal to a diameter of the open core of the knuckle and a second dimension of the FPC is less than or equal to a height of the slot.

4. The head-mounted wearable device of claim 1, wherein the front frame comprises a unitary piece; and further comprising:
a lens assembly comprising:
a left lens,
a right lens, and
a lens bridge located between the left lens and the right lens, wherein the lens bridge joins the left lens and the right lens to the frame bridge.

5. A wearable device comprising:
a left hinge at a left side of a front frame;
a right hinge at a right side of the front frame;
wherein the left hinge comprises:
an upper hinge including:
an upper cylindrical engagement feature including an open core providing a passage to an interior of the upper hinge, and
a first engagement feature;
a hinge base including:
a lower cylindrical engagement feature, and
a second engagement feature to couple to the first engagement feature of the upper hinge; and
a left temple and a right temple, the left temple comprising:
a knuckle comprising an open core to accept the upper cylindrical engagement feature and the lower cylindrical engagement feature of the left hinge,
a compartment, and
a slot extending from the compartment to an interior of the open core of the knuckle.

6. The wearable device of claim 5, wherein the upper cylindrical engagement feature comprises:
a circular perimeter arranged perpendicular to an axis of rotation of the left hinge; and
one or more protrusions extending parallel to the axis of rotation, wherein the one or more protrusions occupy less than the entire circular perimeter.

7. The wearable device of claim 5, wherein the upper cylindrical engagement feature comprises an adhesive-lined receptacle, and further wherein the second engagement feature comprises a tab sized for insertion within the adhesive-lined receptacle during assembly.

8. The wearable device of claim 5, wherein:
the upper hinge further includes a first hole, and
the hinge base further includes a tab having a second hole; and
a threaded fastener passing through the first hole and the second hole to join the upper hinge and the hinge base.

9. The wearable device of claim 5, further comprising:
a flexible printed circuit (FPC) comprising a plurality of electrical conductors and arranged to pass from the left hinge to the right hinge through the open core of the upper cylindrical engagement feature, the open core of the knuckle, and the slot.

10. The wearable device of claim 5, further comprising:
a channel in the front frame, the channel extending from the left hinge to the right hinge; and
a flexible circuit comprising a plurality of electrical conductors and arranged to pass from the left hinge to the right hinge through the open core of the upper cylindrical engagement feature, the open core of the knuckle, and the slot.

11. The wearable device of claim 5, further comprising:
a flexible circuit having a first right angle bend transitioning from the passage in the upper hinge into the open core of the upper cylindrical engagement feature; and
the flexible circuit comprises a second right angle bend transitioning from the open core of the knuckle into the slot.

12. The wearable device of claim 5, further comprising:
a flexible circuit comprises a first bend transitioning from the passage in the upper hinge into the open core of the upper cylindrical engagement feature;
the flexible circuit comprises a second bend transitioning from the open core of the knuckle into the slot; and
a length of the flexible circuit between the first bend and the second bend is parallel to an axis of rotation of the hinge.

13. The wearable device of claim 12, the flexible circuit comprising a plurality of electrical conductors laminated to a polyethylene terephthalate film substrate.

14. The wearable device of claim 12, the flexible circuit comprising a plurality of electrical conductors lithographically formed on a polymer film.

15. The wearable device of claim 5, further comprising:
a hardware processor arranged in the compartment of the left temple;
a battery arranged in a second compartment of the right temple; and
a flexible circuit connecting the hardware processor and the battery, wherein the flexible circuit passes through the open core of the upper cylindrical engagement feature, the open core of the knuckle, and the slot of the left hinge.

16. A wearable device comprising:
a first hinge at a first side of a front frame;
a second hinge at a second side of the front frame;
wherein the first hinge comprises:
an upper hinge including:
an upper cylindrical engagement feature including:
an open core,
a passage to an interior of the upper hinge; and
a first engagement feature;
a hinge base including:
a lower cylindrical engagement feature, and
a second engagement feature to couple to the first engagement feature of the upper hinge; and a first temple and a second temple, the first temple comprising:
   a knuckle comprising an open core to accept the upper cylindrical engagement feature and the lower cylindrical engagement feature of the first hinge.

17. The wearable device of claim 16, wherein the upper cylindrical engagement feature comprises:
   one or more protrusions arranged along a circular perimeter extending perpendicular to an axis of rotation of the first hinge from a base, wherein the one or more protrusions occupy less than the entire circular perimeter.

18. The wearable device of claim 16, further comprising:
a flexible flat cable comprising one or more of: electrical conductors, optical waveguides, or radio frequency waveguides; the flexible flat cable including:
   a first right angle bend transitioning from the passage in the upper hinge into the open core of the upper cylindrical engagement feature; and
   a second right angle bend transitioning from the open core of the knuckle into a slot.

19. The wearable device of claim 16, wherein the upper hinge further includes a receptacle and further wherein the hinge base further includes a tab sized for insertion within the receptacle.

20. The wearable device of claim 16, wherein:
the upper hinge further includes a first hole, and
the hinge base further includes a tab having a second hole; and
a fastener passing through the first hole and the second hole to join the upper hinge and the hinge base.

21. A wearable device comprising:
a hinge at a first side of a front frame;
wherein the hinge comprises:
   an upper hinge including:
      an upper cylindrical engagement feature including an open core,
      a first engagement feature; and
      a receptacle;
   a hinge base including:
      a lower cylindrical engagement feature,
      a second engagement feature to couple to the first engagement feature of the upper hinge; and
      a tab to insert into the receptacle of the upper hinge; and
a temple comprising:
   a knuckle comprising an open core to accept the upper cylindrical engagement feature and the lower cylindrical engagement feature.

* * * * *